(12) United States Patent
Mullor et al.

(10) Patent No.: US 8,095,977 B2
(45) Date of Patent: Jan. 10, 2012

(54) SECURE PIN TRANSMISSION

(75) Inventors: Miki Mullor, Sammamish, WA (US); Dan Sledz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 11/624,903

(22) Filed: Jan. 19, 2007

(65) Prior Publication Data
US 2008/0178006 A1 Jul. 24, 2008

(51) Int. Cl.
G06F 7/04 (2006.01)
G06F 17/30 (2006.01)
G06F 12/14 (2006.01)
G06F 13/00 (2006.01)

(52) U.S. Cl. ............. 726/20; 726/16; 713/184; 713/185

(58) Field of Classification Search .................... 726/16, 726/20; 713/184, 185
See application file for complete search history.

(56) References Cited

U.S. PATENT DOCUMENTS

| | | | | |
|---|---|---|---|---|
| 5,422,953 A * | 6/1995 | Fischer | .......................... | 713/172 |
| 5,757,918 A * | 5/1998 | Hopkins | .......................... | 705/67 |
| 5,822,435 A * | 10/1998 | Boebert et al. | .................. | 713/192 |
| 5,937,159 A * | 8/1999 | Meyers et al. | ................... | 726/20 |
| 6,257,486 B1 | 7/2001 | Teicher et al. | ................. | 235/380 |
| 6,389,535 B1 * | 5/2002 | Thomlinson et al. | ......... | 713/165 |
| 6,598,032 B1 | 7/2003 | Challener et al. | ............... | 705/72 |
| 6,651,169 B1 * | 11/2003 | Benson et al. | .................. | 713/193 |
| 6,715,078 B1 | 3/2004 | Chasko et al. | ................. | 713/193 |
| 6,736,313 B1 | 5/2004 | Dickson | ......................... | 235/380 |
| 7,003,797 B2 | 2/2006 | Bender et al. | ....................... | 726/9 |
| 7,302,585 B1 * | 11/2007 | Proudler et al. | ............... | 713/189 |
| 7,464,412 B2 * | 12/2008 | Avraham et al. | ................ | 726/34 |
| 2003/0079127 A1 | 4/2003 | Bidan et al. | ..................... | 713/172 |
| 2004/0034784 A1 * | 2/2004 | Fedronic et al. | .............. | 713/186 |
| 2004/0268133 A1 | 12/2004 | Lee et al. | ....................... | 713/186 |
| 2005/0166064 A1 * | 7/2005 | Dive-Reclus et al. | ......... | 713/189 |
| 2005/0172137 A1 | 8/2005 | Hopkins | ........................ | 713/185 |
| 2005/0177522 A1 * | 8/2005 | Williams | ......................... | 705/72 |
| 2006/0053302 A1 * | 3/2006 | Yasaki et al. | ................... | 713/183 |
| 2006/0225127 A1 * | 10/2006 | Roberts et al. | .................... | 726/2 |

FOREIGN PATENT DOCUMENTS

WO WO 02/071177 A2 9/2002

OTHER PUBLICATIONS

George, P., "User Authentication with Smart Cards in Trusted Computing Architecture", http://www.gemplus.com/smart/rd/publications/pdf/SAM2406.pdf, 7 pages.
Yeung, G. et al., "Securing iMash: Integration of Smart Card Technology with a Pervasive Computing Framework", http://www.cs.ucla.edu/~gavin/pub/cs239smartcard.pdf, 15 pages.

(Continued)

Primary Examiner — Michael Simitoski
(74) Attorney, Agent, or Firm — Woodcock Washburn LLP

(57) ABSTRACT

A secure channel is established between a processor and a smart card such that authentication can be achieved without transmitting a Personal Identification Number (PIN) to or from the smart card in the clear. A session ticket indicative of the PIN is generated, and the session ticket is securely negotiated between the computer and the smart card instead of the PIN. Also, a trusted path is established between a user and the operating system of the processor for allowing the user to enter a PIN. A trusted computing base is established in the processor for receiving the PIN from the user and performing operations associated therewith.

11 Claims, 4 Drawing Sheets

OTHER PUBLICATIONS

"Enabling E-Commerce with the FinSmart™ Smart Card Security Solution", 2001, http://www.smartaxis.gr/whitepaper%20finsafe.pdf, 7 pages.

"Smart Card Technology and Security", Nov. 20, 2006, http://people.cs.uchicago.edu/~dinoj/smartcard/security.html, 7 pages.

* cited by examiner

SECURE PIN TRANSMISSION

TECHNICAL FIELD

The technical field relates generally to computer processing and more specifically to computing security.

BACKGROUND

A smart card is a storage device typically possessing an on-card processing capability. It is not uncommon to provide a Personal Identification Number (PIN) to a smart card to access the smart card. Computers can be used to access smart cards. Providing a PIN to a smart card via a computer is not necessarily secure. For example, clear text provided to the smart card by the computer is subject to interception; thus compromising the security of the PIN. Also, a prompt for a PIN, apparently being provided by the computer, could be provided by a rogue application attempting to harvest the PIN. Further, when a user enters a PIN, on a keyboard for example, the PIN is propagated through the computer in the clear, again making the PIN vulnerable to interception.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A secure channel is established for providing a Personal Identification Number (PIN) to a smart card, or the like, from a computer. A ticket is generated, and the ticket is securely negotiated between the computer and the smart card. The ticket is indicative of the PIN, which is a shared secret between the computer and the smart card. Thus, the smart card is authenticated without providing the PIN in clear text to the smart card. Further security is provided by processing the PIN with a Trusted Computing Base (TCB) of the computer. In an example embodiment, when the smart card is inserted into the computer, a TCB is established within the computer. The PIN is provided to the TCB. The TCB requests a ticket from the smart card. The smart card, utilizing the PIN stored therein as a seed, generates a session key. The session key is used to encrypt a session ticket. The encrypted session ticket is provided to the TCB. The TCB decrypts the session ticket using a key generated from the previously received PIN to obtain the session ticket. The TCB provides the decrypted session key to the smart card for authentication.

BRIEF DESCRIPTION OF THE DRAWINGS

The foregoing summary, as well as the following detailed description, is better understood when read in conjunction with the appended drawings. For the purpose of illustrating secure PIN transmission, there is shown in the drawings exemplary constructions thereof, however, secure PIN transmission is not limited to the specific methods and instrumentalities disclosed.

DETAILED DESCRIPTION OF ILLUSTRATIVE EMBODIMENTS

Figure 1:
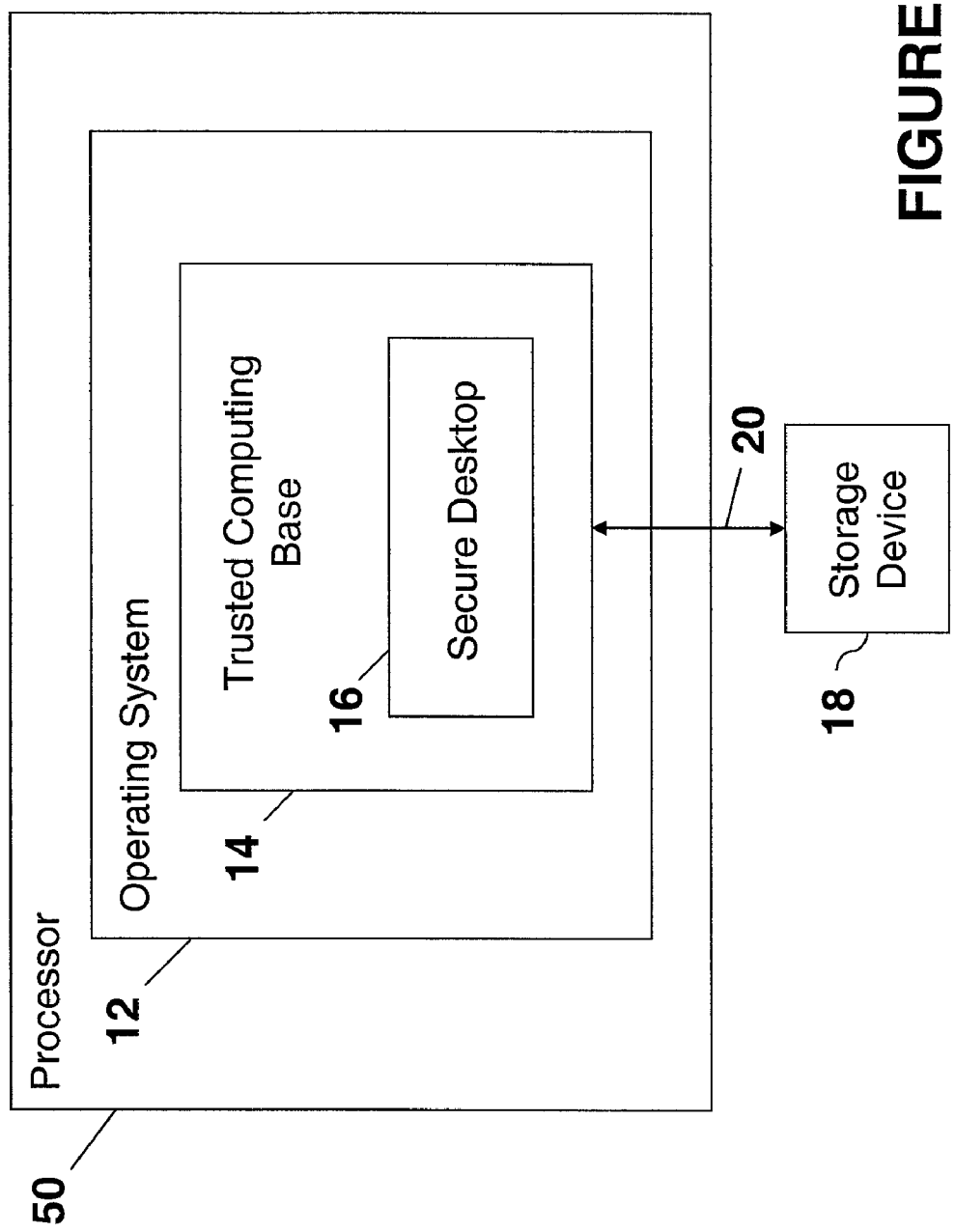
FIG. 1 is a functional block diagram of an example system for providing secure PIN transmission.

FIG. 1 is a functional block diagram of an example system for providing secure PIN transmission comprising a processor 50, an operating system (OS) 12, a trusted computing base (TCB) 14, and a secure desktop 16. The OS can comprise any appropriate OS, such as a WINDOWS® operating system, for example. The interface 20 between the OS 12 and the storage device 18 provides a secure channel for providing a Personal Identification Number (PIN) to the storage device 18 from the OS 12. The storage device 18 can comprise any appropriate storage device, such as a smart card, a Universal Serial Bus (USB) compatible device, or the like, for example. The interface 20 can comprise any appropriate interface, such as a wired interface, a wireless interface (e.g., Bluetooth compatible wireless interface), or a combination thereof, for example.

The processor 50 is representative of any appropriate type of processor, or processor, that can be utilized with the storage device 18. The processor 50 can represent a single processor or multiple processors. Multiple processors can be distributed or centrally located. The processor 50 can represent a portable device, or devices, such as, for example, a portable media player, e.g., a portable music player, such as an MP3 player, a walkmans, etc., a portable computing device, such as a laptop, a personal digital assistant ("PDA"), a portable phone, such as a cell phone of the like, a smart phone, a video phone, a portable email device, a thin client, a portable gaming device, etc., or a combination thereof.

In an example scenario, a user inserts the storage device 18 into the processor 50 hosting the OS 12. The storage device 18 does not necessarily have to be inserted, but could be swiped by, held proximate to, pointed toward, and/or transmit to (e.g., Bluetooth transmission) the processor hosting the OS 12. In response to the storage device 18 being inserted, or the like, the OS 12, establishes the secure desktop 16 with the TCB 14. The TCB 14 is a secure environment within the OS 12. The TCB comprises a set of trusted applications that operate under a separate security context than a user or an applications requesting PIN authentication. The secure desktop 16 is established within the TCB 14. The TCB 14 and the secure desktop 16 provide a trusted path between the user and OS 12. The trusted path ensures that a PIN dialog box cannot be spoofed. To establish the trusted path, in this example scenario, in response to inserting, or the like, the storage device 18, a prompt is presented requesting the user to enter a secure attention sequence (SES). A secure attention sequence comprise a predetermined key sequence that will be captured by the operating system and/or TCB before any other application. The secure attention sequence can be any appropriate sequence, such as Ctrl+Alt+Delete (CAD) for example. The prompt for CAD indicates that the "Ctrl" key and the "Alt" key and the "Delete" key of a keyboard are to be depressed simultaneously. When the CAD keys are entered, a message is provided via the secure desktop 16 to enter a PIN (e.g., "Enter PIN"). The PIN entry dialog is conducted via the secure desktop 16 and thus is secure. Entering the CAD key combination ensures that the OS 12 is the first entity to capture the binary information that is entered. The secure desktop 16 provides security attributes that protect the entry of the PIN from malware (malicious software) attack while the OS 12 is in this mode. Only relevant application can run in the secure desktop 16. And, the relevant applications are isolated from interaction with other applications except in connection with predetermined functions such as returning a session key. For example, only a secure PIN application running in the TCB 14 could run in the secure desktop. In an example embodiment, the secure desktop 16 is rendered such that its visual appearance indicates that it is a secure desktop. For example, the secure desktop could lack shell features such as a user defined background, a taskbar, icons, or the like, for example.

In response to the request to enter a PIN, the user enters a PIN. The PIN is provided to the TCB 14 via the secure desktop 16. The entered PIN is stored within the TCB 14. The PIN is now a shared secret between the OS 12 and the storage device 18. The TCB 14 provides a request for a session ticket, via the interface 20, to the storage device 18. The request does not include the PIN. In response to the request, the storage device 18, having the PIN stored therein, generates a session ticket. The storage device 18 generates a session key using the PIN stored therein as a seed. The session key can comprise any appropriate key, such as a cryptographic key, a symmetric cryptographic key, an asymmetric cryptographic key, or the like, for example. The session ticket is encrypted using the session key. The session ticket can be encryption using any appropriate encryption scheme, such as a symmetric encryption scheme (e.g., DES), an asymmetric encryption scheme (e.g., Public-Key encryption, RSA), or the like, for example. The encrypted session ticket is provided to the OS 12 via the interface 20. Within the TCB 14, another key is generated using the entered PIN as a seed, utilizing the same technique as used by the storage device 18. The encrypted session ticket is decrypted using the generated key. The decrypted session ticket is provided to the storage device 18, via the interface 20, for authentication. If the decrypted session ticket received by the storage device 18 matches the session ticket that was generated by the storage device 18, authentication is achieved.

Figure 2:
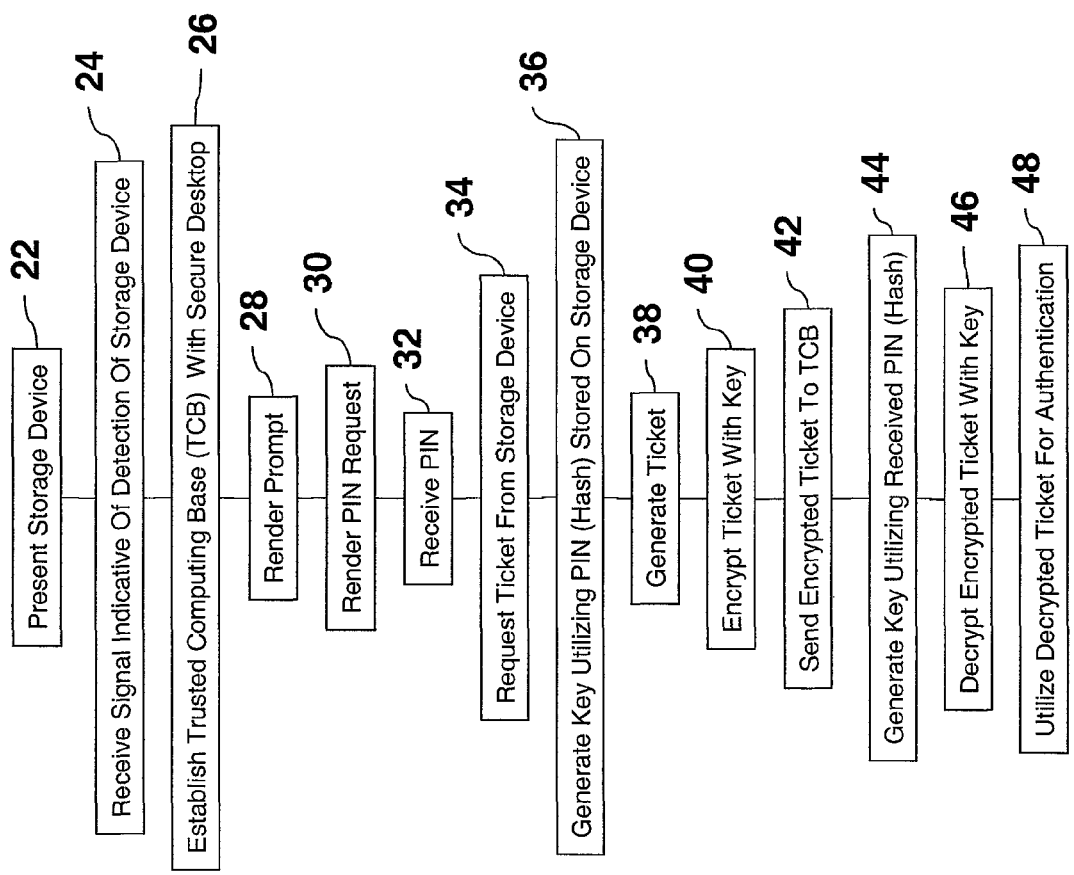
FIG. 2 is a flow diagram of an example process for providing secure PIN transmission.

FIG. 2 is a flow diagram of an example process for providing secure PIN transmission. The storage device is presented to a processor or the like at step 22. As described above, the storage device (e.g., smart card) can be inserted into, swiped by, held proximate to, pointed toward, and/or transmit to, a mechanism capable of detecting the storage device. The mechanism to which the storage device is being presented detects the storage device, and at step 24, a signal is received indicative of the detection of the storage device. In response to receiving the signal, if not established, a TCB is established at step 26. The TCB comprises a secure desktop. A prompt to provide an indication to establish a trusted path for entry of a PIN is rendered at step 28. The prompt can be for any appropriate indication to establish a trusted path for entry of a PIN. For example, any keystroke combination can be requested, a prompt to position a display cursor to a specific location could provided, or a combination thereof. In an example embodiment, a prompt to enter Ctrl+Alt+Delete is rendered.

The indication to utilize a secure desktop (e.g., enter CAD), is provide in response to the prompt rendered at step 28. At step 30, a request to enter a PIN is rendered. A PIN is entered in response to the prompt rendered at step 30. At step 32, the PIN is received. As described above, the PIN is received within the TCB and processing of the PIN is performed within the TCB. At step 34, a ticket is requested from the storage device. The ticket can be utilized for authentication. The ticket can be utilized for the entire time a user is coupled to the storage device, a new ticket can be requested each time the storage device is to be accessed, or a combination thereof. At step 36, the storage device, in response to receiving the request for a ticket, generates a session key. The session key is generated from the PIN stored in the storage device. The PIN can be used in any appropriate manner to generate the session key. For example, the PIN can be used as a seed to generate the session key, and/or a hash value (e.g., hash values obtained via MD5, SHA-1, and/or SHA-256) of the PIN can be used as a seed to generate the session key. As described above, the session key can comprise any appropriate key, such as a cryptographic key, or the like. A session ticket is generated at step 38, and the session key is utilized to encrypt the session ticket at step 40.

The encrypted session ticket, encrypted with the session key, is provided to the TCB at step 42. Within the TCB, the received encrypted session ticket is decrypted. To accomplish decryption of the received encrypted session ticket, a key is generated utilizing the PIN received at step 32. The PIN, or a hash of the PIN, is used to generate the key in a manner similar to the way the PIN, or hash of the PIN, was used to generate the session key by the storage device (at step 36). At step 46, the received encrypted session ticket is decrypted utilizing the key generated at step 44. The decrypted session ticket is provided to the storage device at step 48. The decrypted session ticket is used for authentication instead of the PIN. In response to receiving the decrypted session ticket, the storage device compares the received decrypted session ticket with the session ticket generated at step 38. If the session tickets match authentication is achieved. If the session tickets do not match, authentication is not achieved.

Figure 3:
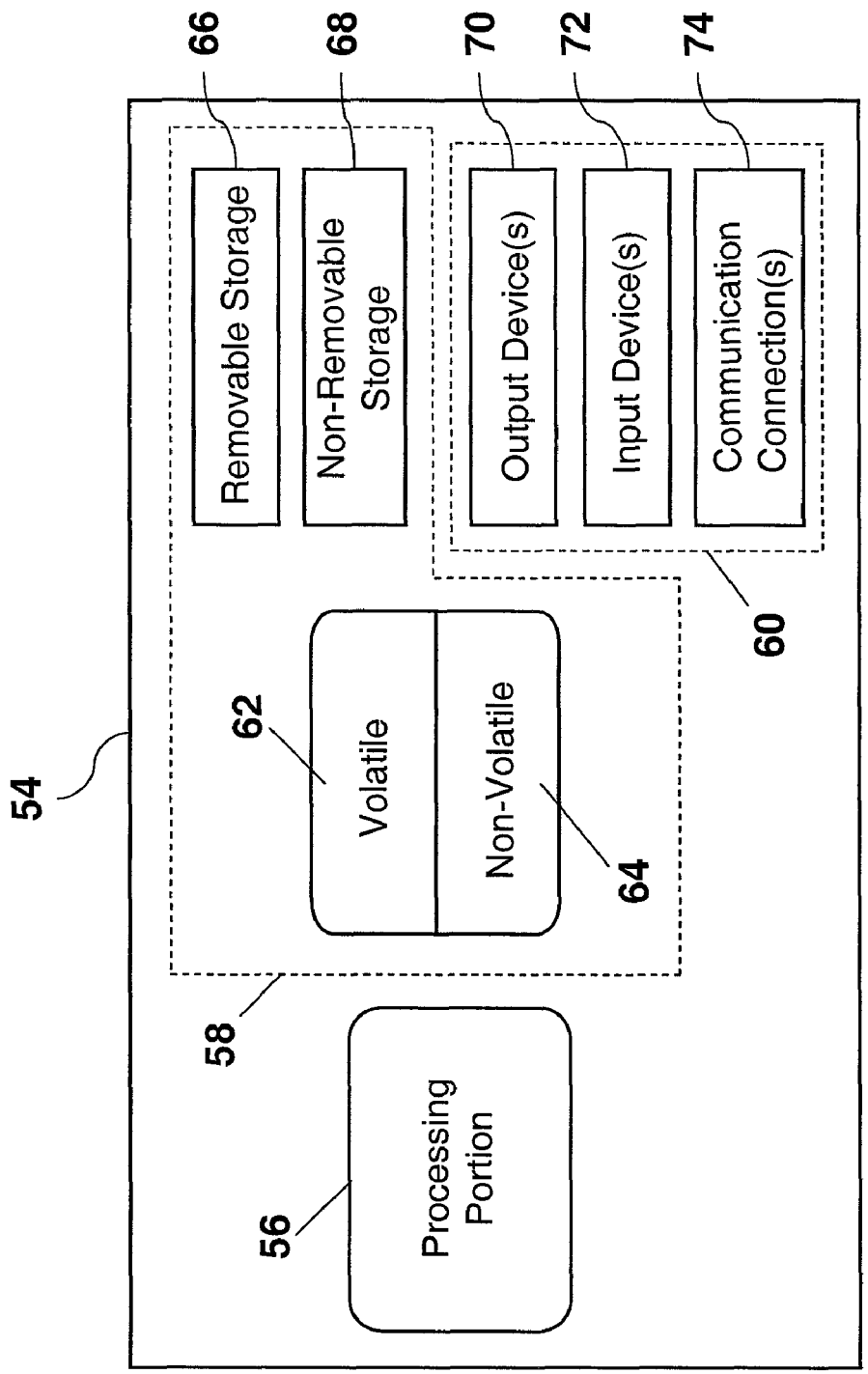
FIG. 3 is a diagram of an exemplary processor for implementing secure PIN transmission.

FIG. 3 is a diagram of an exemplary processor 54 for implementing secure PIN transmission. In an example embodiment, the processor 54 comprises the processor 50, for example. The processor 54 comprises a processing portion 56, a memory portion 58, and an input/output portion 60. The processing portion 56, memory portion 58, and input/output portion 60 are coupled together (coupling not shown in FIG. 3) to allow communications therebetween. The input/output portion 60 is capable of providing and/or receiving components utilized to implement secure PIN transmission as described above. For example, the input/output portion 60 is capable of receiving a signal indicative of detection of a storage device, requesting a ticket from a storage device, receiving an encrypted ticket, providing a ticket, or a combination thereof.

The processing portion 56 is capable of implementing secure PIN transmission as described above. For example, the processing portion 56 is capable of establishing a TCB, establishing a secure desktop, rendering a prompt, rendering a request for a PIN, generating a key utilizing a PIN or a hash of a PIN as a seed, decrypting an encrypted session ticket, or a combination thereof.

The processor 54 can be implemented as a client processor and/or a server processor. In a basic configuration, the processor 54 can include at least one processing portion 56 and memory portion 58. The memory portion 58 can store any information utilized in conjunction with secure PIN transmission, such as a PIN and/or a hash of a PIN, for example. Depending upon the exact configuration and type of processor, the memory portion 58 can be volatile (such as RAM) 62, non-volatile (such as ROM, flash memory, etc.) 64, or a combination thereof. The processor 54 can have additional features/functionality. For example, the processor 54 can include additional storage (removable storage 66 and/or non-removable storage 68) including, but not limited to, magnetic or optical disks, tape, flash, smart cards or a combination thereof. Computer storage media, such as memory portion 58, 62, 64, 66, and 68, include volatile and nonvolatile, removable and non-removable media implemented in any method or technology for storage of information such as computer readable instructions, data structures, program modules, or other data. Computer storage media include, but are not limited to, Random Access Memory (RAM), Read Only Memory (ROM), Electrically Erasable Programmable Read Only Memory (EEPROM), flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 54. Any such computer storage media can be part of the processor 54.

The processor 54 can also contain communications connection(s) 56 that allow the processor 54 to communicate with other devices. Communications connection(s) 56 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 54 also can have input device(s) 54 such as keyboard, mouse, pen, voice input device, touch input device, etc. Output device(s) 70 such as a display, speakers, printer, etc. also can be included.

Figure 4:
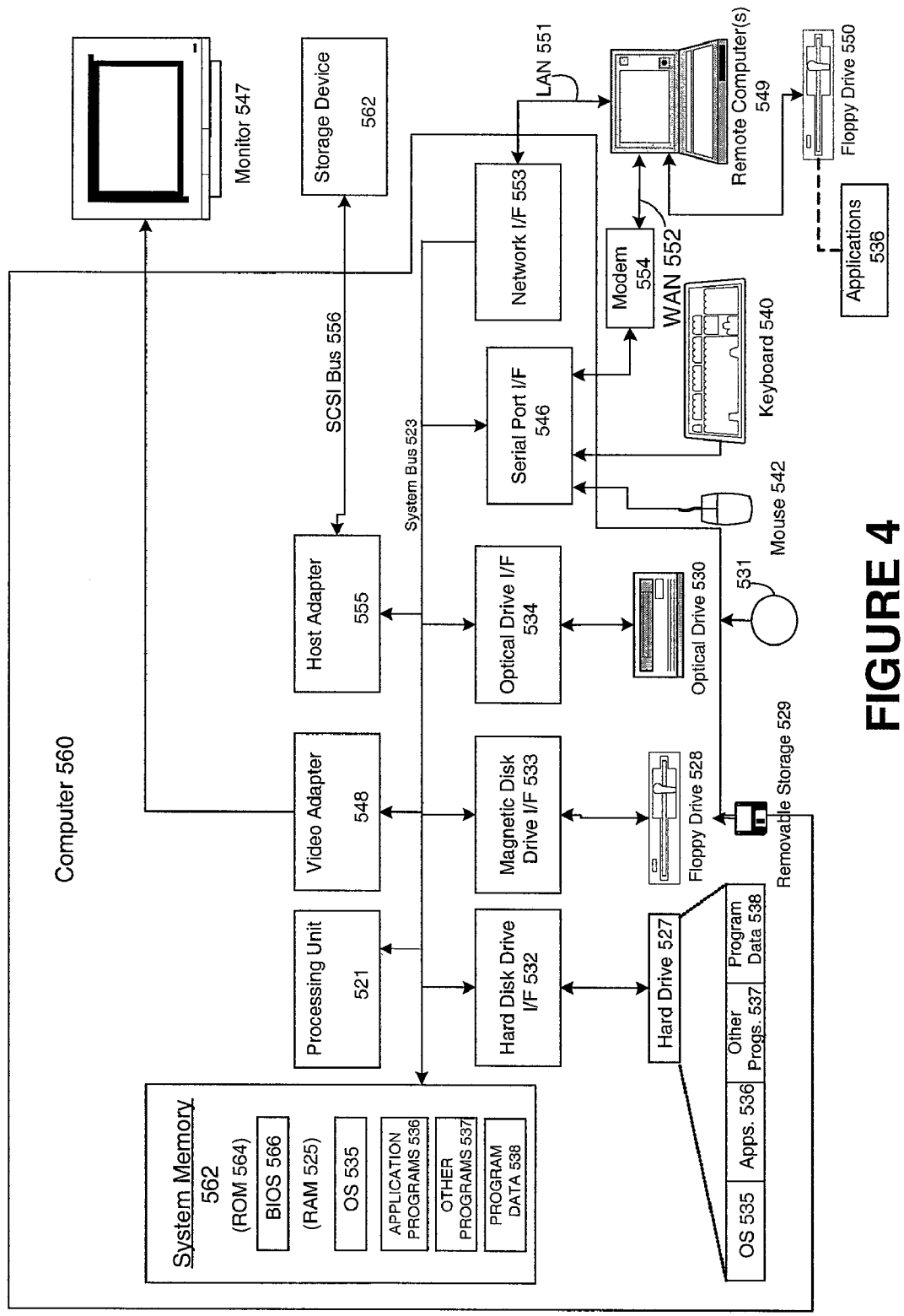
FIG. 4 is a depiction of a suitable computing environment in which providing secure PIN transmission can be implemented.

FIG. 4 and the following discussion provide a brief general description of a suitable computing environment in which secure PIN transmission can be implemented. Although not required, various aspects of secure PIN transmission can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of secure PIN transmission can be practiced with other computer system configurations, including hand held devices, multi processor systems, microprocessor based or programmable consumer electronics, network PCs, minicomputers, mainframe computers, and the like. Further, secure PIN transmission also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with secure PIN transmission as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. In accordance with an example embodiment of secure PIN transmission, the TCB is a subset of the operating system that does not include the shell, but does include the kernel. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 4, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 4 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 4. The logical connections depicted in FIG. 4 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of secure PIN transmission are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing secure PIN transmission, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing secure PIN transmission.

The program(s) can be implemented in assembly or machine language, if desired. In any case, the language can be a compiled or interpreted language, and combined with hardware implementations. The methods and apparatuses for implementing secure PIN transmission also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of secure PIN transmission. Additionally, any storage techniques used in connection with secure PIN transmission can invariably be a combination of hardware and software.

While secure PIN transmission has been described in connection with the example embodiments of the various figures, it is to be understood that other similar embodiments can be used or modifications and additions can be made to the described embodiments for performing the same functions of secure PIN transmission without deviating therefrom. Therefore, secure PIN transmission as described herein should not be limited to any single embodiment, but rather should be construed in breadth and scope in accordance with the appended claims.

What is claimed:

1. An authentication method comprising:
    detecting a smart card communicatively coupled to a computer via a communication link;
    establishing a trusted computing base in the computer for preventing spoofing of a personal identification number (PIN) dialog box;
    prompting a user to enter a personal identification number;
    receiving in the trusted computing base, a first personal identification number entered by the user; and
    using the trusted computing base for securely transferring data between the computer and the smart card for verifying in the smart card, that the first personal identification number entered by the user is the same as a second personal identification number stored in the smart card, the secure transfer comprising:
        the trusted computing base requesting a session ticket from the smart card;
        generating in the smart card, a first session ticket and a first session key, wherein the first session key is generated by utilizing as a seed, the second personal identification number stored in the smart card;
        encrypting the first session ticket with the first session key;
        transmitting the encrypted first session ticket from the smart card to the trusted computing base;
        generating inside the trusted computing base, a second session key by utilizing as a seed, the first personal identification number entered by the user;
        using the second session key for decrypting the encrypted first session ticket received from the smart card;
        transmitting the decrypted first session ticket from the trusted computing base to the smart card;
        comparing the decrypted first session ticket received in the smart card to the first session ticket originally generated in the smart card;
        if the comparison indicates a successful match, authenticating the first personal identification number entered by the user; and
        if the comparison fails to indicate the successful match, disallowing authentication.

2. A method in accordance with claim 1, further comprising rendering, via the trusted computing base, a prompt to provide an indication to establish a trusted path for entry of the personal identification number.

3. A method in accordance with claim 2, further comprising, in response to receiving an indication to establish a trusted path, establishing a secure desktop within the trusted computing base for receiving the personal identification number.

4. A method in accordance with claim 3, further comprising providing, via the secure desktop, the prompt to enter the personal identification number.

5. A method in accordance with claim 2, wherein the prompt comprises a prompt to enter a secure attention sequence.

6. A authentication system comprising:
    an input/output portion configured to:
        receive from a user, a first personal identification number; and
    a processor portion configured to:
        establish a trusted computing base within the system for preventing spoofing of a personal identification number (PIN) dialog box;
        generate, via the trusted computing base, a request for a session ticket from a smart card;
        receive in response to the request, a first session ticket from the smart card, wherein the first session ticket is encrypted, via the trusted computing base, using a first session key, and wherein the first session key is generated, via the trusted computing base, by utilizing as a seed, a second personal identification number stored in the smart card;
        via the trusted computing, generate a second session key and utilize the first personal identification number entered by the user as a seed;
        use the second session key for decrypting the first session ticket received from the smart card; and
        utilizing the trusted computing base to securely transmit the decrypted first session ticket, via the input/output portion, to the smart card for authentication of the first personal identification number, thereby eliminating clear-channel transmission of the first personal identification number, the authentication comprising:
        comparing the decrypted first session ticket received in the smart card to the first session ticket originally generated in the smart card;
        if the comparison indicates a successful match, authenticating the first personal identification number entered by the user; and
        if the comparison fails to indicate the successful match, disallowing authentication.

7. A system in accordance with claim 6, the processing portion further configured to render, via the trusted computing base, a prompt to provide an indication to establish a trusted path for entry of a personal identification number.

8. A system in accordance with claim 7, the processing portion further configured to establish, in response to receiving an indication to establish a trusted path, a secure desktop within the trusted computing base for receiving a personal identification number.

9. A system in accordance with claim 7, wherein the prompt further comprises a prompt to enter a secure attention sequence.

10. A computer-readable storage medium, the computer-readable storage medium not being a transient signal, the computer-readable storage medium having stored thereon computer-executable instructions for performing the steps of:
    establishing a trusted computing base in the computer for preventing spoofing of a personal identification number (PIN) dialog box;
    prompting a user to enter a personal identification number;
    receiving a first personal identification number entered by the user; and
    using the trusted computing base for authenticating the entered first personal identification number, the authenticating comprising:
        requesting a session ticket from a smart card;
        receiving, in response to the request, a first session ticket encrypted using a first session key, wherein the first session key is generated utilizing as a seed, a second personal identification number stored in the smart card;
        decrypting the received first session ticket, utilizing a second session key, wherein the second session key is generated using as a seed, the first personal identification number entered by the user; and eliminating clear-channel transmission of the first personal identification number over a communication link, by transmitting the decrypted first session ticket over the communication link to the smart card for authentication of the first personal identification number, the authentication comprising:

comparing the decrypted first session ticket received in the smart card to the first session ticket originally generated in the smart card;

if the comparison indicates a successful match, authenticating the first personal identification number entered by the user; and if the comparison fails to indicate the successful match, disallowing authentication.

11. A computer-readable storage medium in accordance with claim 10, the computer-executable instructions further for:

rendering, via the trusted computing base, a prompt to provide an indication to establish a trusted path for entry of a personal identification number; and in response to receiving an indication to establish a trusted path, establishing a secure desktop within the trusted computing base for receiving a personal identification number.

* * * * *